(12) United States Patent
Fang et al.

(10) Patent No.: US 11,132,260 B2
(45) Date of Patent: Sep. 28, 2021

(54) DATA PROCESSING METHOD AND APPARATUS

(71) Applicant: HUAWEI TECHNOLOGIES CO., LTD., Guangdong (CN)

(72) Inventors: Hao Fang, Shenzhen (CN); Jieshan Bi, Shenzhen (CN); Chaoqiang Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 522 days.

(21) Appl. No.: 15/927,301

(22) Filed: Mar. 21, 2018

(65) Prior Publication Data
US 2018/0210794 A1    Jul. 26, 2018

Related U.S. Application Data

(63) Continuation of application No. PCT/CN2016/087458, filed on Jun. 28, 2016, and a continuation of application No. PCT/CN2016/085608, filed on Jun. 13, 2016.

(30) Foreign Application Priority Data

Sep. 25, 2015    (CN) .......................... 201510620975.9

(51) Int. Cl.
*G06F 16/27* (2019.01)
*G06F 11/14* (2006.01)
(Continued)

(52) U.S. Cl.
CPC ...... *G06F 11/1451* (2013.01); *G06F 11/1446* (2013.01); *G06F 11/1469* (2013.01);
(Continued)

(58) Field of Classification Search
CPC ............. G06F 11/1446; G06F 2201/84; G06F 11/1451; G06F 11/1461; G06F 11/1469; G06F 3/0644; G06F 16/27
See application file for complete search history.

(56) References Cited

U.S. PATENT DOCUMENTS 6,785,786 B1 * 8/2004 Gold .................. G06F 11/1469
711/162
7,809,691 B1    10/2010 Karmarkar et al.
(Continued)

FOREIGN PATENT DOCUMENTS

CN        101064730 A    10/2007
CN        101300553 A    11/2008
(Continued)

OTHER PUBLICATIONS

Wang Li-feng, Study of Large Objects Storage Scheme in HBase Database. Computer Knowledge and Technology, vol. 10, No. 23, Aug. 2014, 7 pages.

*Primary Examiner* — Marcin R Filipczyk
(74) *Attorney, Agent, or Firm* — Leydig, Voit & Mayer, Ltd.

(57) ABSTRACT

The present application provides a data processing method and apparatus. The method includes: when a region in a table of a database system meets a predefined condition, saving data in the region as a data storage file to a storage device, where the data storage file includes time metadata, and the time metadata comprises a region write time of the data in the region; when a condition for triggering a combination operation is met, obtaining a time for performing a backup operation most recently; selecting at least two first data storage files, where a region write time recorded in time metadata included in the at least two first data storage files is before the obtained time; and combining the selected at (Continued)

least two first data storage files, therefore resolving a problem in the prior art that a time consumed for performing a backup operation is long.

20 Claims, 8 Drawing Sheets

(51) Int. Cl.
    *G06F 16/22*            (2019.01)
    *G06F 16/23*            (2019.01)
    *G06F 3/06*             (2006.01)

(52) U.S. Cl.
    CPC .......... *G06F 11/1471* (2013.01); *G06F 16/22* (2019.01); *G06F 16/2343* (2019.01); *G06F 16/27* (2019.01); *G06F 3/0644* (2013.01); *G06F 11/1464* (2013.01); *G06F 2201/81* (2013.01); *G06F 2201/84* (2013.01)

(56) References Cited

U.S. PATENT DOCUMENTS

| | | | |
|---|---|---|---|
| 8,005,797 | B1 | 8/2011 | Chepel et al. |
| 10,078,555 | B1* | 9/2018 | Kumar ................ G06F 11/1451 |
| 2003/0056139 | A1 | 3/2003 | Murray et al. |
| 2005/0131990 | A1 | 6/2005 | Jewell |
| 2009/0119350 | A1 | 5/2009 | Yamaguchi et al. |
| 2012/0036106 | A1 | 2/2012 | Desai et al. |
| 2014/0052692 | A1 | 2/2014 | Zhang et al. |
| 2014/0214769 | A1 | 7/2014 | Takayama |
| 2018/0139053 | A1* | 5/2018 | Kadam ................ G06F 11/1451 |

FOREIGN PATENT DOCUMENTS

| | | |
|---|---|---|
| CN | 101394424 A | 3/2009 |
| CN | 101650677 A | 2/2010 |
| CN | 101729671 A | 6/2010 |
| CN | 102541940 A | 7/2012 |
| CN | 102955861 A | 3/2013 |
| CN | 102999400 A | 3/2013 |
| CN | 103049353 A | 4/2013 |
| CN | 103778033 A | 5/2014 |
| CN | 103793493 A | 5/2014 |
| CN | 104081329 A | 10/2014 |
| CN | 104199901 A | 12/2014 |
| CN | 104199963 A | 12/2014 |
| CN | 105005617 A | 10/2015 |
| CN | 105243109 A | 1/2016 |
| CN | 107111534 A | 8/2017 |
| EP | 3287911 A1 | 2/2018 |

* cited by examiner

DATA PROCESSING METHOD AND APPARATUS

CROSS-REFERENCE TO RELATED APPLICATION

This application is a continuation of both International Application No. PCT/CN2016/087458, filed on Jun. 28, 2016, and International Application No. PCT/CN2016/085608, filed on Jun. 13, 2016. The International Application No. PCT/CN2016/085608 claims priority to Chinese Patent Application No. 201510620975.9, filed on Sep. 25, 2015. All of the above applications are hereby incorporated by reference in their entireties.

TECHNICAL FIELD

The present application relates to the database field, and in particular, to a data processing method and apparatus.

BACKGROUND

As conventional database technologies become increasingly mature and computer network technologies develop rapidly and are in wider use, a database system is more widely applied.

In the prior art, data is first written into a memory that is corresponding to a region in a table. When a region meets a specific condition, data in the region is saved to a storage device, so as to form a data storage file such as an Hfile. As data is continually written into the database, there is a large quantity of data storage files in the storage device. To improve data reading performance, all data storage files in a same table are combined into one data storage file. However, in a backup scenario, particularly in an incremental backup scenario, such a combination operation brings the following problem: When an incremental backup operation is performed after the combination operation, all data in the entire table needs to be read, so as to determine data on which the incremental backup operation needs to be performed. As a result, network resources are wasted and a time consumed for performing the backup operation is relatively long.

SUMMARY

The present application provides a data processing method and apparatus, so as to resolve a problem in the prior art that a long time is consumed in a backup process and a large quantity of network resources are consumed.

To achieve the foregoing objective, the following technical solutions are used in the present application:

According to a first aspect, a data processing method is provided, where the method is applied to a database system, the database system includes a table, the table includes at least one region, and the method includes:

when any region of the at least one region meets a predefined condition, saving data in the region that meets the predefined condition as a data storage file to a storage device, where the data storage file includes time metadata, and the time metadata is a region write time of the data in the region that meets the predefined condition;

obtaining a backup operation time when a condition for triggering a combination operation is met, where the backup operation time is a time for performing a backup operation most recently;

selecting at least two first data storage files from the storage device, where a region write time recorded in time metadata included in the at least two first data storage files is before the time for performing a backup operation most recently; and combining the selected at least two first data storage files.

Specifically, the backup operation time records the time for performing a backup operation most recently. It should be noted that, the time that is for performing a backup operation and that is recorded in the database system may be saved to a preset file in the storage device, to a table in a preset database, or to a distributed lock. The distributed lock may be a Zookeeper.

Optionally, the database system in this embodiment of the present application may record a time for performing each backup operation in the preset file in the storage device, the table in the preset database, or the distributed lock. Before each combination operation is performed, a recorded time for performing a backup operation most recently is read from the preset file, the table in the preset database, or the distributed lock.

In addition, in a specific implementation process, selection and combination policies may be flexibly configured according to a factor such as a quantity or a size of the data storage files. A combination operation may be performed on all the data storage files at a time, or the data storage files may be selected for multiple times, and a combination operation is performed on some of the data storage files each time.

It should be noted that, for a quantity of data storage files obtained by performing the combination operation, different preset policies may be configured in a specific implementation process according to a factor such as a preset maximum specification for each data storage file and a quantity or a size of to-be-combined data storage files, and at least one data storage file is obtained after the combination. This is not limited in the present application.

In the process described in the foregoing content, in the data processing method provided in this embodiment, when a combination operation is performed, a time that is for performing a backup operation and that is recorded in a database system is obtained, and only a data storage file before a time for performing a backup operation most recently is combined, so that a problem of data reading performance in the prior art is resolved. In addition, in the foregoing combination method, the time for performing a backup operation most recently is used as a demarcation, and the combination operation is performed on the data storage files that are before the time. In comparison with a combination method in the prior art that all data storage files are combined into one data storage file, a problem in the combination method in the prior art that a data storage file newly added after the time for performing a backup operation most recently cannot be found quickly can be resolved, a time consumed in a backup process is reduced, backup efficiency in the database is improved, and network resources consumed are reduced.

With reference to the first aspect, in a first possible implementation of the first aspect, the method further includes:

selecting at least two second data storage files from the storage device, where a region write time recorded in time metadata included in the at least two second data storage files is after the time for performing a backup operation most recently; and combining the selected at least two second data storage files.

Specifically, the second data storage file is used only to distinguish different data storage files instead of representing a quantity of the data storage files, and may include one or more data storage files.

According to the description of the foregoing content, when a predefined condition for triggering a combination operation is met, a time for performing a backup operation most recently is obtained, the time for performing a backup operation most recently is used as a demarcation, data storage files before the time for performing a backup operation most recently are combined into at least one data storage file, and data storage files after the time for performing a backup operation most recently are combined into at least one data storage file, so that a problem of data reading performance of a database system is resolved. In comparison with the combination method in the prior art that all data storage files in a storage device are combined into one data storage file, a combination policy may be flexibly configured according to a factor such as a size or a quantity of the data storage files. A combination operation may be performed on all the data storage files, or a combination operation may be performed on some of the data storage files. In comparison with the combination method in the prior art that all the data storage files are combined into one data storage file, a problem of data reading performance is resolved by using the data processing method provided in this embodiment of the present application, and network and disk read operations consumed by the combination operation are reduced by means of more flexible policy configuration. According to another aspect, in the foregoing combination method, in a backup scenario, particularly in an incremental backup scenario, a data storage file newly added after a time for performing a backup operation most recently can be found quickly, so as to complete a backup operation. Therefore, time for performing a backup is reduced, and network resources consumed for performing the backup are significantly reduced.

With reference to the first aspect, or the first possible implementation of the first aspect, in a second possible implementation of the first aspect, the condition for triggering a combination operation is that a quantity of data storage files in the storage device is greater than or equal to a second threshold; or is a predefined cycle for performing a combination operation; or is that a command for performing a combination operation is received.

According to the description of the foregoing content, when a predefined condition for triggering a combination operation is met, a time for performing a backup operation most recently is obtained, and the time for performing a backup operation most recently is used as a demarcation, a data storage file before the time for performing a backup operation most recently and a data storage file after the time for performing a backup operation most recently are combined separately. In the foregoing combination method, in a backup scenario, particularly in an incremental backup scenario, a data storage file newly added after a time for performing a backup operation most recently can be found quickly, so as to complete a backup operation. Therefore, time for performing a backup is reduced, and network resources consumed for performing the backup are significantly reduced.

Optionally, in a possible embodiment of the present application, time metadata information included in a data storage file may be a time when data in a region is saved to a storage device as a data storage file, that is, a generation time of the data storage file. When a condition for triggering combination is met, by comparing a time for performing a backup operation most recently and time metadata information of the data storage file in the storage device, a data storage file before the time for performing a backup operation most recently and a data storage file after the time for performing a backup operation most recently may be determined, and then the data storage file before the time for performing a backup operation most recently and the data storage file after the time for performing a backup operation most recently are combined separately. A combination operation may be performed on all the data storage files at a time, or the data storage files may be selected for multiple times, and a combination operation is performed on some of the data storage files each time. A specific operation process is the same as the content described in the foregoing embodiment, and details are not described herein again. In a backup scenario, particularly in an incremental backup scenario, in comparison with a combination method in the prior art, a data storage file after a time for performing a backup operation most recently can also be identified quickly, so as to complete a backup operation, a time consumed for performing a backup operation and system resources consumed are reduced, and efficiency for performing the backup operation is improved.

Optionally, in another possible embodiment of the present application, a combination flag bit may be added to a data storage file, and whether the data storage file needs to be combined is determined according to the combination flag bit. For example, when the combination flag bit is 0, it indicates that a backup operation is not completed for the data storage file; when the combination flag bit is 1, it indicates that a backup operation is completed for the data storage file. For example, when data in a region is saved to a storage device as a data storage file, an initial value of the combination flag bit is 0. When a condition for triggering a backup operation is met, the data storage file in the storage device is backed up. The backup operation may be full backup, or may be incremental backup. After the backup operation is completed, the combination flag bit of the data storage file that is backed up is updated to 1. When a condition for triggering a combination operation is met, all data storage files whose combination flag bit is 1 in the storage device are combined. A specific combination method may be performing a combination operation on all the data storage files at a time, or the data storage files may be selected for multiple times, and the combination operation is performed on some of the data storage files each time. A specific operation process is the same as the content described in the foregoing embodiment, and details are not described herein again. In the foregoing combination method, in a backup scenario, particularly in an incremental backup scenario, when the condition for triggering a backup operation is met next time, only a data storage file whose combination flag bit is 0 needs to be backed up. It should be noted that in this embodiment, that an initial flag bit of a combination flag bit is 0, and a flag bit of a data storage file that is backed up is 1 are only an example. In a specific implementation process, other content may also be used to identify a data storage file that is backed up and a data storage file that is not backed up. This is not limited in the present application. In comparison with the prior art, in the foregoing method, a data storage file after a backup operation is performed most recently can also be identified quickly. Therefore, efficiency for performing the backup operation is improved.

With reference to any one of the first aspect, or the first to the second possible implementations of the first aspect, in a third possible implementation of the first aspect, the method further includes:

when a condition for triggering a backup operation is met, backing up, by the database system, a data storage file that is in the storage device and whose region write time recorded in time metadata is after the backup operation time; and updating the backup operation time to a time for performing a current backup operation.

Specifically, each time a backup operation is performed, the database system updates a backup time to a time for performing a current backup operation.

With reference to any one of the first aspect, or the first to the second possible implementations of the first aspect, in a fourth possible implementation of the first aspect, the method further includes:

when a condition for triggering a backup operation is met, backing up, by a third-party backup system, a data storage file that is in the storage device and whose region write time recorded in time metadata is after the time for performing a backup operation most recently; and updating the backup operation time to a time for performing a current backup operation.

With reference to any one of the first aspect, or the first to the second possible implementations of the first aspect, in a fifth possible implementation, the method further includes:

when a condition for triggering a backup operation is met, backing up, by the database system, all data storage files in the storage device; and updating the backup operation time to a time for performing a current backup operation.

With reference to any one of the first aspect, or the first to the second possible implementations of the first aspect, in a sixth possible implementation, the method further includes:

when a condition for triggering a backup operation is met, backing up, by a third-party backup system, all data storage files in the storage device; and updating the backup operation time to a time for performing a current backup operation.

With reference to any one of the third to the sixth possible implementations of the first aspect, in a seventh possible implementation of the first aspect, the condition for triggering a backup operation is a predefined cycle for performing a backup operation, or is that a command for performing a backup operation is received.

Specifically, the condition for triggering a backup operation may be performed according to a predefined backup cycle, or may be performed by a person objectively. The database system performs the backup operation after receiving a command for performing a backup operation.

In conclusion, in the data processing method provided in this embodiment, when a combination operation is performed, a backup operation time is obtained, and only a data storage file before a time for performing a backup operation most recently is combined, so that a problem of data reading performance in the prior art is resolved. In addition, in the foregoing combination method, the time for performing a backup operation most recently is used as a demarcation, and a data storage file before the time for performing a backup operation most recently and a data storage file after the time for performing a backup operation most recently are combined separately. In comparison with a combination method in the prior art that all data storage files are combined into one data storage file, a problem in the combination method in the prior art that a data storage file newly added after the time for performing a backup operation most recently cannot be found quickly can be resolved, a time consumed in a backup process is reduced, backup efficiency in the database is improved, and network resources consumed are reduced. According to another aspect, when a combination operation is performed, a combination policy is flexibly configured according to a factor such as a size or a quantity of the data storage files. A combination operation may be performed on all the data storage files, or a combination operation may be performed on some of the data storage files. In comparison with the combination method in the prior art that all the data storage files are combined into one data storage file, a problem of data reading performance is resolved by using the data processing method provided in this embodiment of the present application, and network and disk read operations consumed by the combination operation are reduced by means of more flexible policy configuration.

According to a second aspect, a data processing apparatus is provided, where the apparatus includes a processing unit, an obtaining unit, a selection unit, and a combination unit, where the processing unit is configured to: when any region of at least one region in a table included in a database system meets a predefined condition, save data in the region that meets the predefined condition as a data storage file to a storage device, where the data storage file includes time metadata, and the time metadata is a region write time of the data in the region that meets the predefined condition;

the obtaining unit is configured to obtain a backup operation time when a condition for triggering a combination operation is met, where the backup operation time is a time for performing a backup operation most recently;

the selection unit is configured to select at least two first data storage files from the storage device, where a region write time recorded in time metadata included in the at least two first data storage files is before the time for performing a backup operation most recently; and the combination unit is configured to combine the selected at least two first data storage files.

According to the apparatus described in the foregoing method, a data storage file before the time for performing a backup operation most recently is combined, so as to improve data reading performance of a database. When a backup operation is performed, a data storage file after the time for performing a backup operation most recently can be identified quickly, so as to back up the data storage file, and a time consumed for performing the backup operation is reduced.

With reference to the second aspect, in a first possible implementation of the second aspect, the selection unit is further configured to select at least two second data storage files from the storage device, where a region write time recorded in time metadata included in the at least two second data storage files is after the time for performing a backup operation most recently; and the combination unit is further configured to combine the selected at least two second data storage files.

With reference to the second aspect, or the first possible implementation of the second aspect, in a second possible implementation of the second aspect, the condition for triggering a combination operation is that a quantity of data storage files in the storage device is greater than or equal to a second threshold; or is a predefined cycle for performing a combination operation; or is that a command for performing a combination operation is received.

According to the description of the apparatus, a time for performing a backup operation most recently is obtained, a data storage file that is backed up and a data storage file that is not backed up are combined separately, so as to improve data reading performance of a database. According to another aspect, in a backup scenario, in comparison with the prior art, a problem of a delay caused by the combination method in the prior art that a data storage file after the time for performing a backup operation most recently cannot be identified quickly is resolved, efficiency for performing the backup operation is improved, and network resources consumed are reduced.

With reference to any one of the second aspect, or the first to the second possible implementations of the second aspect, in a third possible implementation of the second aspect, the apparatus further includes a backup unit and an update unit, where the backup unit is configured to: when a condition for triggering a backup operation is met, back up a data storage file that is in the storage device and whose region write time recorded in time metadata is after the time for performing a backup operation most recently; and the update unit is configured to update the backup operation time to a time for performing a current backup operation.

With reference to any one of the second aspect, or the first to the second possible implementations of the second aspect, in a fourth possible implementation of the second aspect, the apparatus further includes a backup unit and an update unit, where the backup unit is configured to back up all data storage files in the storage device when a condition for triggering a backup operation is met; and the update unit is configured to update the backup operation time to a time for performing a current backup operation.

With reference to the third or fourth possible implementation of the second aspect, in a fifth possible implementation of the second aspect, the condition for triggering a backup operation is a predefined cycle for performing a backup operation, or is that a command for performing a backup operation is received.

In conclusion, a time for performing a backup operation most recently is recorded in a database system. When a combination operation is performed, the time for performing a backup operation most recently is used as a demarcation, and a data storage file before the time for performing a backup operation most recently and a data storage file after the time for performing a backup operation most recently are combined separately. In the foregoing combination method, when a backup instruction is received or a backup cycle is met, a data storage file newly added after the time for performing a backup operation most recently can be found quickly, so as to complete a backup operation. Therefore, data reading performance of the database system is improved, a problem in the prior art that a time consumed for performing a backup operation is long is resolved, disk and network resources consumed by the backup operation for performing a read request on a disk are reduced, and efficiency for performing the backup operation is improved.

A person skilled in the art should understand that, in the method described in the foregoing content, the combination operation and the backup operation are independent of each other.

Optionally, when a backup instruction is received or a predefined cycle for performing a backup operation is met, a third data storage file in a storage device is backed up. The third data storage file is selected from the storage device, and the third data storage file is combined.

Specifically, the third data storage file is used only to distinguish different data storage files instead of representing a quantity of the data storage files. The third data storage file may be all the data storage files in the storage device, or may be any data storage file in the storage device. Therefore, backing up the third data storage file may be backing up all the data storage files in the storage device, or may be backing up a data storage file newly added after the time for performing a backup operation most recently.

After backup is completed, one combination operation is performed immediately to combine all data storage files in a same table that are backed up, so as to ensure data reading performance of the database system. In addition, this avoids a problem that when a data storage file is newly added between a current backup operation and a next combination operation, a data storage file that is backed up and a data storage file that is not backed up need to be distinguished. When a combination operation is performed next time, only the data storage file that is not backed up needs to be combined, and when a condition for performing a backup operation is met, a data storage file newly added after the time for performing a backup operation most recently can also be identified quickly, so as to complete a backup operation quickly. Therefore, a time consumed for performing a backup operation and network resources consumed are reduced, and backup efficiency is improved.

According to a third aspect, a data processing apparatus is provided, where the apparatus includes a processor, a storage, a storage device, a bus, and a communications interface; the processor, the storage, the communications interface, and the storage device perform communication by using the bus, or may implement communication by using another means such as wireless transmission, where the storage is configured to store an instruction, and is further configured to store a table of a database system, where the table includes at least one region; and the processor is configured to execute the instruction stored in the storage, so as to:

when any region of the at least one region meets a predefined condition, save data in the region that meets the predefined condition as a data storage file to a storage device, where the data storage file includes time metadata, and the time metadata is a region write time of the data in the region that meets the predefined condition;

obtain a backup operation time when a condition for triggering a combination operation is met, where the backup operation time is a time for performing a backup operation most recently;

select at least two first data storage files from the storage device, where a region write time recorded in time metadata included in the at least two first data storage files is before the time for performing a backup operation most recently; and combine the selected at least two first data storage files.

According to a fourth aspect, a computer readable medium is provided, and is configured to store a computer program, where the computer program includes an instruction used to perform the method in any one of the first aspect, or the first to the seventh possible implementations of the first aspect.

Based on the foregoing technical solution, according to the data processing method and apparatus in the embodiments of the present application, a time for performing a backup operation most recently is obtained, when a predefined condition for triggering combination is met, a data storage file that is backed up and a data storage file that is not backed up are combined separately, so as to improve reading performance of a table in a database. According to another aspect, in a backup scenario, particularly in an incremental backup scenario, in comparison with the prior art, in the data processing method provided in the present application, a data storage file after the time for performing a backup operation most recently can be identified quickly, so as to complete a backup operation quickly. Therefore, network resources consumed and a time consumed for performing the backup operation can be reduced, and efficiency for performing the backup operation is improved.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The method provided in the embodiments of the present application is applied to a database. The database may be a distributed database.

Figure 1:
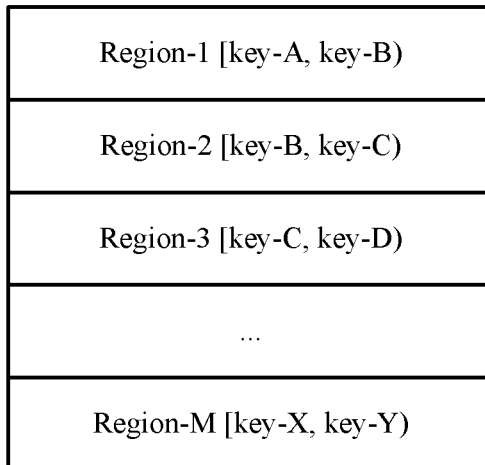
FIG. 1 is a schematic diagram of a region in a table in the prior art.

The database includes at least one table (Table). The table is used to store data of a user. For example, a table named user information is used to store basic information of a user, and a table named transaction information is used to store transaction record details of the user. In the database, a storage manner of a key-value (Key-Value) type may be used to store data, that is, data that needs to be stored by the user is stored in a value part, and a key corresponding to the value is constructed. When the user needs to search for a value, a corresponding value is found by using a key index. Data storage is naturally sorted in a lexicographical order of the key. Each table may include a large amount of data. For ease of management and maintenance, each table is divided into multiple regions (Region) according to a lexicographical order of the key. Each table includes one or more regions. Each region is a set of data in consecutive key intervals, or may be referred to as a set of data in consecutive rows. Each key may only fall in an interval managed by a region, and there is no cross key among different regions. FIG. 1 is a schematic diagram of a region in a table. As shown in FIG. 1, region-1 is a set of multiple keys that start with key-A and end with key-B, and the set includes key-A; region-2 is a set of multiple keys that start with key-B and end with key-C, and the set includes key-B; . . . ; region-M is a set of multiple keys that start with key-X and end with key-Y, and the set includes key-X. Key-A in region-1 is an infinitesimal value in a lexicographical order, and key-Y in region-M is an infinite value in the lexicographical order. It can be seen from FIG. 1 that one table includes at least one region, each region includes one or more keys, and there is no duplicate key among different regions.

A person skilled in the art should understand that a database system includes multiple tables, and each table includes at least one region. When there is data that needs to be written into a table, the data is first written into a memory of a region in the table; when any region of the at least one region meets a predefined condition, data in the region that meets the predefined condition is saved to a storage device, so as to form a data storage file such as an Hfile. In this way, as data is continually written into different regions in the table, data in each region is successively saved to the storage device, so as to form a data storage file. The storage device may include multiple data storage files. Each data storage file is corresponding to data in one region. Each data storage file includes time metadata. The time metadata is used to record a region write time in a region that is corresponding to the data included in the data storage file for the data included in the data storage file.

As the data is continually written into the table, a quantity of the data storage files in the storage device also increases with the continuous writing. When a predefined condition for triggering a combination operation is met, the combination operation is performed on multiple data storage files in a same table, so as to improve data reading performance of a distributed database.

It should be noted that, according to an amount of data written into a memory of a corresponding region and a size of the memory of the region, sizes of data storage files may be the same, or may be different. A specific processing process is the prior art, and details are not described herein.

To avoid a data loss caused by a system fault or a misoperation, a data storage file in a database needs to be backed up, that is, the data storage file is copied into another location in the storage device, or into a disk array, or into another backup storage device. The backup includes full backup and incremental backup. The full backup means that all data storage files in the storage device are copied into another location in the storage device, or into the disk array, or into the another backup storage device. The incremental backup means that a storage file newly added after a time for performing a backup operation most recently is occupied into the another location in the storage device, or into the disk array, or into the another backup storage device. A backup operation may be triggered manually or periodically according to a reliability requirement for the data in the storage device in a specific implementation process. For example, a full backup operation is set, by using a preset periodic backup policy, to be performed on all the data storage files in the storage device at 24:00 every Monday, and an incremental backup operation is set to be performed at 24:00 from Tuesday to Sunday separately, so as to improve reliability of the data in the database system.

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

Figure 2:
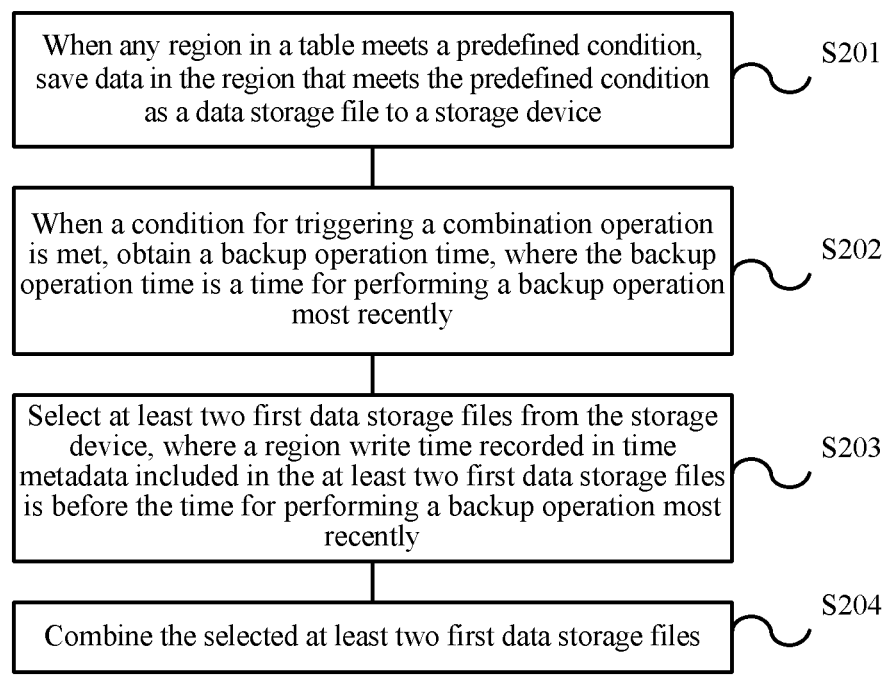
FIG. 2 is a schematic flowchart of a data processing method according to an embodiment of the present application.

FIG. 2 is a schematic diagram of a data processing method according to an embodiment of the present application. As shown in FIG. 2, the method includes the following steps.

S201. When any region in a table meets a predefined condition, save data in the region that meets the predefined condition as a data storage file to a storage device.

The data storage file includes time metadata. The time metadata is a region write time of the data in the region that meets the predefined condition.

For example, during 8:10 to 8:50, one piece of data is written into region-1 every one minute, and there are 50 pieces of data in total written into region-1. It is assumed that in this case, the region meets the predefined condition and the 50 pieces of data in the region are saved to a data storage file 1 in the storage device, and time metadata information corresponding to the data storage file 1 includes a region write time of the 50 pieces of data, that is, the time metadata includes 8:10, 8:11, 8:12, . . . , 8:49, 8:50. Optionally, the time metadata information corresponding to the data storage file 1 may record only an earliest region write time and a latest region write time of the data, that is, the time metadata includes the earliest write time 8:10 and the latest write time 8:50. Optionally, the time metadata information corresponding to the data storage file 1 may record only the latest region write time of the data, that is, the time metadata includes only the latest write time 8:50.

S202. When a condition for triggering a combination operation is met, obtain a backup operation time, where the backup operation time is a time for performing a backup operation most recently.

Specifically, as data is continually written into multiple tables in a database system, there are multiple data storage files in the storage device, so that data reading performance of the database system is affected. Therefore, the data storage files in the storage device need to be combined, so as to improve the data reading performance of the database system.

The condition for triggering a combination operation may be specifically any one of the following three manners.

Manner 1: A quantity of all the data storage files in the storage device is greater than or equal to a second threshold.

Multiple data storage files in multiple tables are stored in the storage device. When the quantity of all the data storage files in the storage device is greater than or equal to the second threshold, the condition for triggering a combination operation is met.

For example, when the quantity of all the data storage files in the storage device is greater than or equal to 5, the condition for triggering a combination operation is met.

Manner 2: A predefined cycle for performing a combination operation is met.

The combination operation may also be performed according to the predefined cycle for performing a combination operation.

For example, it is assumed that the predefined cycle for performing a combination operation is one hour, and the database system performs a combination operation once every one hour. For example, the database system performs one combination operation at 8:00, and performs another combination operation at 9:00.

Manner 3: An instruction for performing a combination operation is received.

The combination operation may also be performed by a person objectively. The database system performs the combination operation when receiving the instruction for performing a combination operation.

In addition, the backup operation time is a time for performing a backup operation most recently.

For example, if the database system performs one backup operation at 8:00, the backup operation time is 8:00. If the database system performs another backup operation at 9:00, the backup operation time is updated to 9:00.

It should be noted that, the database system may record only a time for performing a backup operation most recently, and save the time to a preset file in the storage device, to a table in a preset database, or to a distributed lock. The distributed lock may be a Zookeeper.

Optionally, the database system in this embodiment of the present application may record a time for performing each backup operation in the preset file in the storage device, the table in the preset database, or the distributed lock. Before each combination operation is performed, a recorded time for performing a backup operation most recently is read from the preset file, the table in the preset database, or the distributed lock.

For example, the database system separately backs up the data storage files in the storage device at 8:00, 9:00, and 10:00, and time information of 8:00, 9:00, and 10:00 is recorded in the preset file, the preset database, or the distributed lock. When a combination operation is performed next time, a recorded time for performing a backup operation most recently, that is, 10:00, is read from the recorded information. This may also record the time for performing a backup operation most recently in this embodiment of the present application. In the following specific description of this embodiment of the present application, that backup time recorded in the database system is only a time for performing a backup operation most recently is used as an example to further make a detailed description.

S203. Select at least two first data storage files from the storage device, where a region write time recorded in time metadata included in the at least two first data storage files is before the time for performing a backup operation most recently.

S204. Combine the selected at least two first data storage files.

The first data storage file is used only to distinguish different data storage files instead of representing a quantity of the data storage files, and may include one or more data storage files.

Specifically, in a specific implementation process, selection and combination policies may be flexibly configured according to a factor such as a quantity or a size of the data storage files. For example, according to time metadata in a data storage file and the obtained time for performing a backup operation most recently in step S202, a data storage file before the time for performing a backup operation most recently can be determined. A combination operation may be performed on all the data storage files at a time, or the data storage files may be selected for multiple times, and a combination operation is performed on some of the data storage files each time.

For example, a combination operation may be performed according to a quantity of data storage files. If ten data storage files are backed up in a backup operation performed most recently, the combination operation may be performed on all the ten data storage files at a time; or five data storage files may be selected first, and then the other five data storage files are selected, so as to perform the combination operation twice; or five data storage files may be selected first, and then three data storage files are selected, so as to perform the combination operation, and the other two data storage files are not combined.

A combination operation may also be performed according to a size of a data storage file. When a proportion among the sizes of the ten data storage files that are backed up is 2:2:2:2:2:2:1:1:1:20, a combination operation may be performed on all the data storage files; or the first to the sixth data storage files may be selected first to perform a combination operation, and the seventh to the tenth data storage files are selected then to perform a combination operation. To reduce storage and network resources consumed by performing the combination operation, the first to the ninth data storage files may further be selected to perform a combination operation, and the tenth data storage file is not combined.

It should be noted that, for a quantity of data storage files obtained by performing the combination operation, different preset policies may be configured in a specific implementation process according to a factor such as a preset maximum specification for each data storage file and a quantity or a size of to-be-combined data storage files, and at least one data storage file is obtained after the combination. This is not limited in the present application. In the following specific description process in the present application, that one data storage file is obtained after combination is used as an example to further make a detailed description.

In the process described in the foregoing step S201 to step S204, when the data processing method provided in this embodiment is used to perform a combination operation, a time for performing a backup operation most recently is obtained, and only a data storage file before the time for performing a backup operation most recently is combined, so that a problem of data reading performance of a database system is resolved. In addition, in the foregoing combination method, the time for performing a backup operation most recently is used as a demarcation to combine the data storage file before the time. In comparison with a combination method in the prior art that all data storage files are combined into one data storage file, a problem in the combination method in the prior art that a data storage file newly added after the time for performing a backup operation most recently cannot be found quickly can be resolved, a time consumed in a backup process is reduced, backup efficiency in the database is improved, and network resources consumed are reduced. According to another aspect, when a combination operation is performed, a combination policy is flexibly configured according to a factor such as a size or a quantity of the data storage files. A combination operation may be performed on all data storage files, or a combination operation may be performed on some of the data storage files. In comparison with the combination method in the prior art that all the data storage files are combined into one data storage file, a problem of data reading performance is resolved by using the data processing method provided in this embodiment of the present application, and network and disk read operations consumed by the combination operation are reduced by means of more flexible policy configuration.

Figure 3:
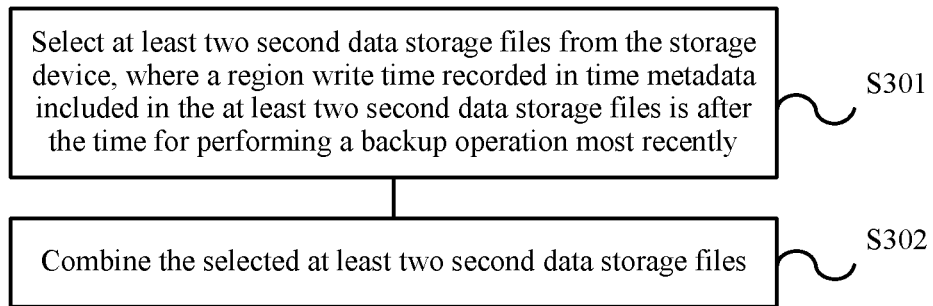
FIG. 3 is a schematic flowchart of another data processing method according to an embodiment of the present application.

Optionally, it may be learned from the foregoing description that a combination operation performed on a data storage file in a storage device may improve data reading performance of a database system. When a data storage file before the time for performing a backup operation most recently is combined, a combination operation may further be performed on a data storage file after the time for performing a backup operation most recently, so that an amount of data stored in a data storage file in the storage device is reduced, and data reading performance of the database is further optimized. As shown in FIG. 3, the data processing method shown in FIG. 2 further includes the following steps.

S301. Select at least two second data storage files from the storage device, where a region write time recorded in time metadata included in the at least two second data storage files is after the time for performing a backup operation most recently.

Specifically, the second data storage file is used only to distinguish different data storage files instead of representing a quantity of the data storage files, and may include one or more data storage files.

S302. Combine the selected at least two second data storage files.

Specifically, a processing process for selection and combination operations in step S301 and step S302 is the same as that described in step S203 and step S204, that is, the selected at least two second data storage files in step S301 are combined into at least one data storage file.

Figure 3A:
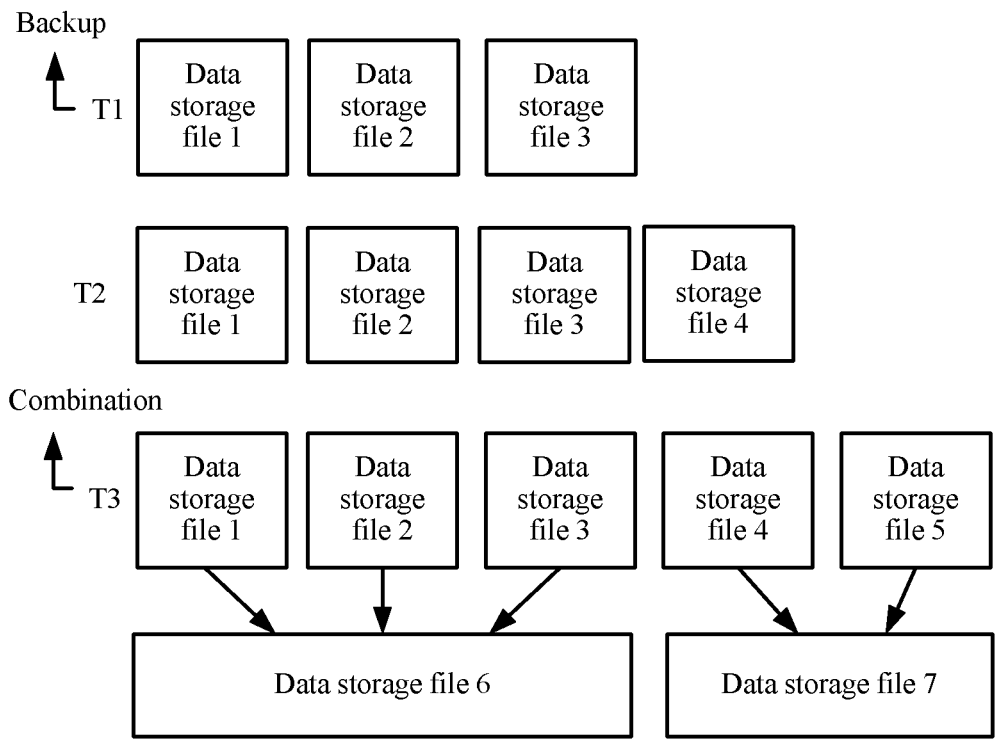
FIG. 3A is a schematic diagram of another data processing method according to an embodiment of the present application.

For example, as shown in FIG. 3A, with reference to the content described in step S201 to step S204 and step S301 and step S302, a time for performing a backup operation most recently is used as a demarcation, and a data storage file before the time for performing a backup operation most recently and a data storage file after the time for performing a backup operation most recently are combined separately, so as to improve data reading performance of a database system. For example, at a T1 moment, a backup operation is performed on all data storage files stored in a storage device, that is, a data storage file 1, a data storage file 2, and a data storage file 3 are backed up; at a T2 moment, a data storage file 4 is newly added; and at a T3 moment, a data storage file 5 is newly added. It is assumed that in this case a predefined condition for triggering a combination operation is met, and the data storage file 1, the data storage file 2, and the data storage file 3 before the T1 moment are combined into a data storage file 6, and the data storage file 4 and the data storage file 5 newly added after the T1 moment are combined into a data storage file 7, so as to improve data reading performance of the database system.

According to the description of the foregoing content, when a predefined condition for triggering a combination operation is met, a time for performing a backup operation most recently is obtained, the time for performing a backup operation most recently is used as a demarcation, data storage files before the time for performing a backup operation most recently are combined into at least one data storage file, and data storage files after the time for performing a backup operation most recently are combined into at least one data storage file, so that a problem of data reading performance of a database system is resolved. In comparison with the combination method in the prior art that all data storage files in a storage device are combined into one data storage file, a combination policy is flexibly configured according to a factor such as a size or a quantity of the data storage files. A combination operation may be performed on all the data storage files, or a combination operation may be performed on some of the data storage files. In comparison with the combination method in the prior art that all the data storage files are combined into one data storage file, a problem of data reading performance is resolved by using the data processing method provided in this embodiment of the present application, and network and disk read operations consumed by the combination operation are reduced by means of more flexible policy configuration. According to another aspect, in the foregoing combination method, in a backup scenario, particularly in an incremental backup scenario, a data storage file newly added after a time for performing a backup operation most recently can be found quickly, so as to complete a backup operation. Therefore, time for performing a backup is reduced, and network resources consumed for performing the backup are significantly reduced.

Optionally, in a possible embodiment of the present application, time metadata information included in a data storage file may be a time when data in a region is saved to a storage device as a data storage file, that is, a generation time of the data storage file. When a condition for triggering combination is met, by comparing a time for performing a backup operation most recently and time metadata information of the data storage file in the storage device, a data storage file before the time for performing a backup operation most recently and a data storage file after the time for performing a backup operation most recently may be determined, and then the data storage file before the time for performing a backup operation most recently and the data storage file after the time for performing a backup operation most recently are combined separately. A combination operation may be performed on all the data storage files at a time, or the data storage files may be selected for multiple times, and a combination operation is performed on some of the data storage files each time. A specific operation process is the same as the content described in step 203 and step 204, and details are not described herein again. In a backup scenario, particularly in an incremental backup scenario, in comparison with a combination method in the prior art, a data storage file after a time for performing a backup operation most recently can also be identified quickly, so as to complete a backup operation, a time consumed for performing a backup operation and system resources consumed are reduced, and efficiency for performing the backup operation is improved.

Optionally, in another possible embodiment of the present application, a combination flag bit may be added to a data storage file, and whether the data storage file needs to be combined is determined according to the combination flag bit. For example, when the combination flag bit is 0, it indicates that a backup operation is not completed for the data storage file; when the combination flag bit is 1, it indicates that a backup operation is completed for the data storage file. For example, when data in a region is saved to a storage device as a data storage file, an initial value of the combination flag bit is 0. When a condition for triggering a backup operation is met, the data storage file in the storage device is backed up. The backup operation may be full backup, or may be incremental backup. After the backup operation is completed, the combination flag bit of the data storage file that is backed up is updated to 1. When a condition for triggering a combination operation is met, all data storage files whose combination flag bit is 1 in the storage device are combined. A specific combination method may be performing a combination operation on all the data storage files at a time, or the data storage files may be selected for multiple times, and the combination operation is performed on some of the data storage files each time. A specific operation process is the same as the content described in step 203 and step 204, and details are not described herein again. In the foregoing combination method, in a backup scenario, particularly in an incremental backup scenario, when the condition for triggering a backup operation is met next time, only a data storage file whose combination flag bit is 0 needs to be backed up. It should be noted that in this embodiment, that an initial flag bit of a combination flag bit is 0, and a flag bit of a data storage file that is backed up is 1 are only an example. In a specific implementation process, other content may also be used to identify a data storage file that is backed up and a data storage file that is not backed up. This is not limited in the present application. In comparison with the prior art, in the foregoing method, a data storage file newly added after a backup operation is performed most recently can be identified quickly. Therefore, efficiency for performing the backup operation is improved.

In the following description, with reference to the data processing method described in the foregoing content, a processing process of the method provided in this embodiment of the present application in a backup scenario is further described. The method includes the following steps.

S401. When a condition for triggering a backup operation is met, back up a data storage file that is in the storage device and whose region write time recorded in time metadata is after the time for performing a backup operation most recently.

Specifically, the condition for triggering a backup operation may be a predefined cycle for performing a backup operation. For example, the predefined cycle for performing a backup operation is performing a backup operation once every week, or the backup operation may be performed by a person objectively, that is, a database system performs a backup operation after receiving a command for performing a backup operation.

When the condition for triggering a backup operation is met, a data storage file newly added after the time for performing a backup operation most recently may be determined according to the time for performing a backup operation most recently and the time metadata of the data storage file stored in the storage device. The data storage file newly added is copied into another location of the storage device, or into a disk array, or into another backup storage device, so as to ensure data reliability.

S402. Update a backup operation time to a time for performing a current backup operation.

Specifically, each time a backup operation is performed, the database system updates a backup time to a time for performing a current backup operation, that is, updates the backup time to the backup operation time in step S401, so that when a predefined condition for triggering combination is met, the backup operation time is read when a combination or another related operation is performed. For example, in step S201, a time that is for performing a backup operation most recently and that is recorded in the backup time is first obtained, and then a data storage file before the time for performing a backup operation most recently is combined.

Figure 4:
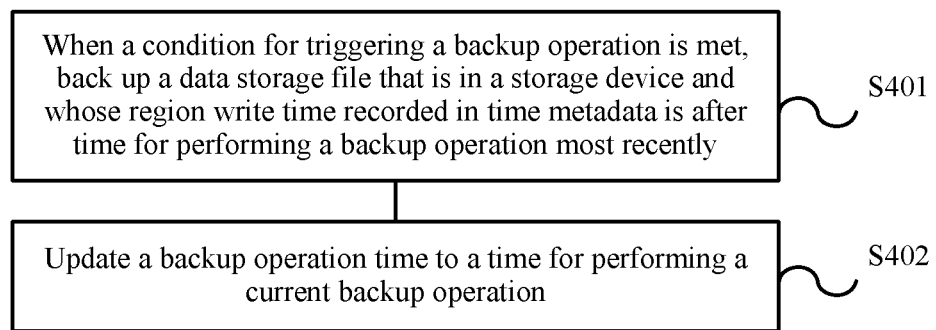
FIG. 4 is a schematic flowchart of a backup operation according to an embodiment of the present application.
Figure 4A:
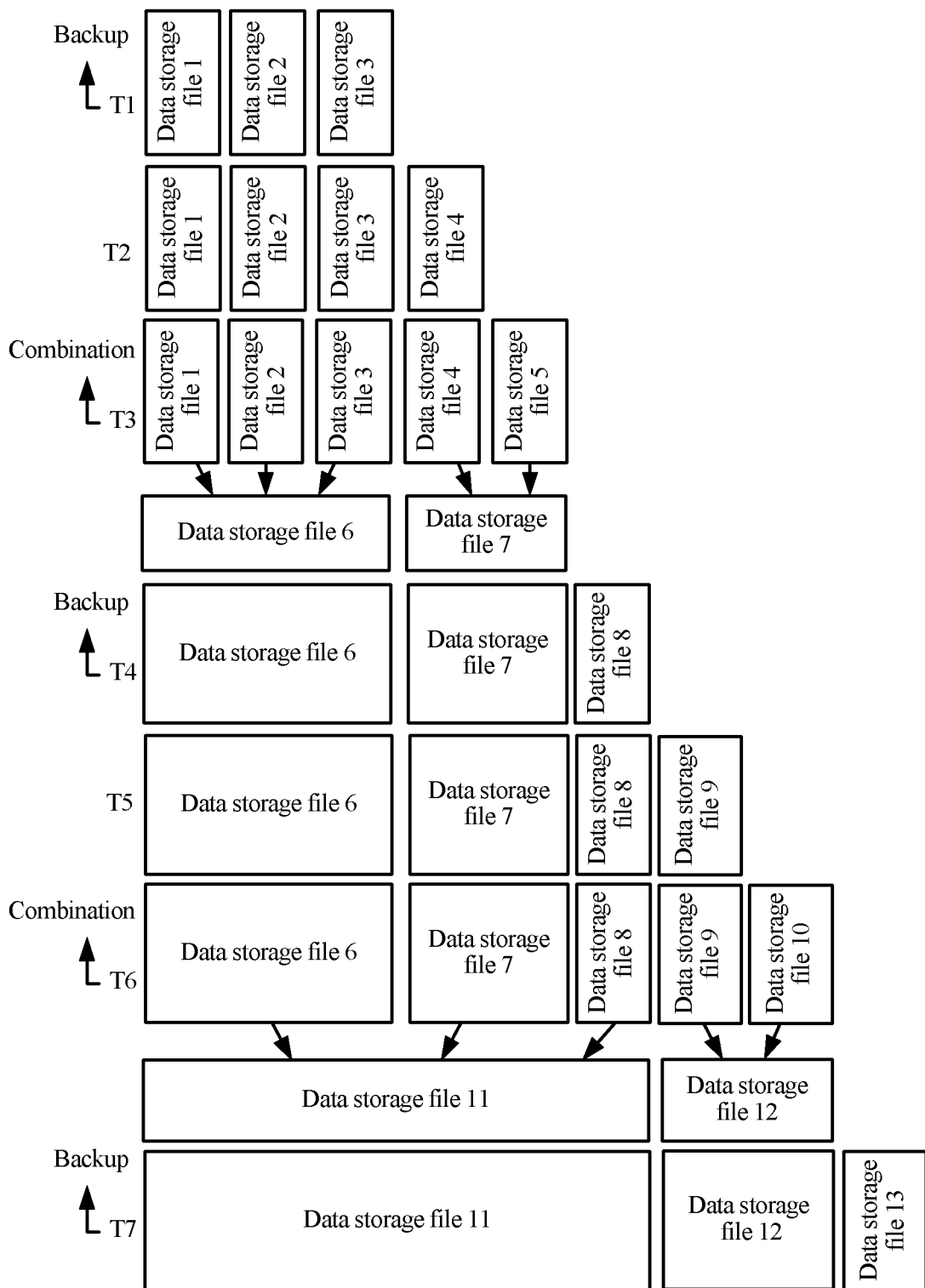
FIG. 4A is a schematic diagram of a backup operation according to an embodiment of the present application.

For example, FIG. 4A is a schematic diagram of a data backup process with reference to step S401 and step S402. As shown in FIG. 4, at a T1 moment, a data storage file 1, a data storage file 2, and a data storage file 3 in a system are backed up; at a T2 moment, a data storage file 4 is newly added; at a T3 moment, a data storage file 5 is newly added to a storage device. In this case, there are five storage files in the storage device. It is assumed that a predefined condition for triggering a combination operation is met, and the time T1 moment for performing a backup operation most recently is used as a demarcation, the data storage file 1, the data storage file 2, and the data storage file 3 that are before the T1 moment are combined into a data storage file 6, and the data storage file 4 and the data storage file 5 that are after the T1 moment are combined into a data storage file 7. At a T4 moment, a backup instruction is received or a predefined cycle for performing a combination operation is met, the backup operation is performed. According to the time T1 moment for performing a backup operation most recently and time metadata included in each data storage file, the data storage file 7 newly added after the T1 moment and a data storage file 8 are determined, and the data storage file 7 and the data storage file 8 are backed up. At a T5 moment, a data storage file 9 is newly added. Further, at a T6 moment, a data storage file 10 is newly added. Currently, there are five data storage files in total in the storage device, and the predefined condition for triggering combination is met again. The time T4 moment for performing a backup operation most recently is used as a demarcation, the data storage file 6, the data storage file 7, and the data storage file 8 are combined into a data storage file 11, and the data storage file 9 and a data storage file 10 are combined into a data storage file 12. At a T7 moment, when a backup instruction is received or a backup cycle is met, a data storage file newly added after the T4 moment is determined according to the T4 moment and time metadata information in a data storage file, and the data storage file 12 and a data storage file 13 are backed up. In this way, in the data processing method provided in this embodiment of the present application, a data storage file newly added after a time for performing a backup operation most recently can be identified quickly, a time consumed for performing a backup operation is reduced, and efficiency for performing the backup operation is improved.

In conclusion, a time for performing a backup operation most recently is recorded. When a combination operation is performed, the time for performing a backup operation most recently is used as a demarcation, and a data storage file before the time for performing a backup operation most recently and a data storage file after the time for performing a backup operation most recently are combined separately. In the foregoing combination method, in a backup operation scenario, particularly in an incremental backup scenario, a data storage file newly added after the time for performing a backup operation most recently can be found quickly, so as to complete a backup operation. This not only improves data reading performance of a database system, but also resolves a problem in the prior art that a time consumed for performing a backup operation is long, disk and network resources consumed by the backup operation for performing a read request on a disk are reduced, and efficiency for performing the backup operation is improved.

Figure 4B:
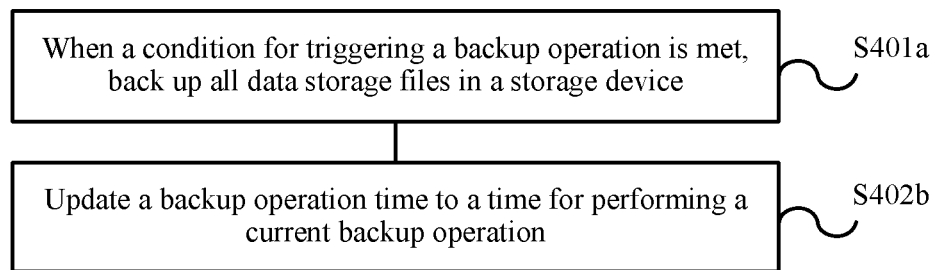
FIG. 4B is a schematic diagram of another backup operation according to an embodiment of the present application.

Optionally, as shown in FIG. 4B, with reference to the data processing method described in FIG. 2, the backup processing process may further be:

S401a. When a condition for triggering a backup operation is met, back up all data storage files in the storage device.

S402b. Update a backup operation time to a time for performing a current backup operation.

In the method described in step S401a and step S402b, when the condition for triggering a backup operation is met, a backup operation is performed on all the data storage files in the storage device, and a backup operation time is updated to a time for performing a current backup operation. When a condition for triggering combination is met next time, a combination operation may be completed according to the time for performing a backup operation most recently. When the condition for triggering a backup is met again, regardless of whether all the data storage files in the storage device are backed up, or only a data storage file after the time for performing a backup operation most recently is backed up, corresponding data storage files can be identified quickly, and a delay for performing a backup operation is shortened.

The foregoing backup operations are all performed by the database system. Optionally, a backup operation may be performed by a third-party backup system. When a condition for triggering a backup operation is met, the third-party backup system performs a backup operation, and records and saves a time for performing a backup operation most recently. The backup operation may be full backup, or may be incremental backup. Optionally, the backup operation time may be recorded and saved by a database system. When third-party backup software performs the backup operation, the database system is notified of updating the backup operation time. When a condition for triggering a combination operation is met, the database system may obtain the time for performing a backup operation most recently. The time for performing a backup operation most recently is used as a demarcation, and the combination operation is performed. A specific process and method for performing a combination operation are the same as the content described in step S203 and step S204, and details are not described herein again.

In conclusion, a time for performing a backup operation most recently is obtained. When a combination operation is performed, the time for performing a backup operation most recently is used as a demarcation, and a data storage file before the time for performing a backup operation most recently and a data storage file after the time for performing a backup operation most recently are combined separately, so as to improve reading performance of a table. According to another aspect, in comparison with the prior art, in the foregoing data processing method, when a backup instruction is received or a backup cycle is met, a data storage file newly added after the time for performing a backup operation most recently can be identified quickly, so as to complete a backup operation. Therefore, a problem in the prior art that a time consumed for performing a backup operation is long is resolved, disk and network resources consumed by the backup operation for performing a read request on a disk are reduced, and efficiency for performing the backup operation is improved.

A person skilled in the art should understand that, in the method described in the foregoing content, the combination operation and the backup operation are independent of each other. The combination operation is immediately performed when a predefined condition for triggering combination is met, and the backup operation is performed when a backup instruction is received or a backup cycle is met. The backup operation and the combination operation are not performed in a sequence.

Figure 5:
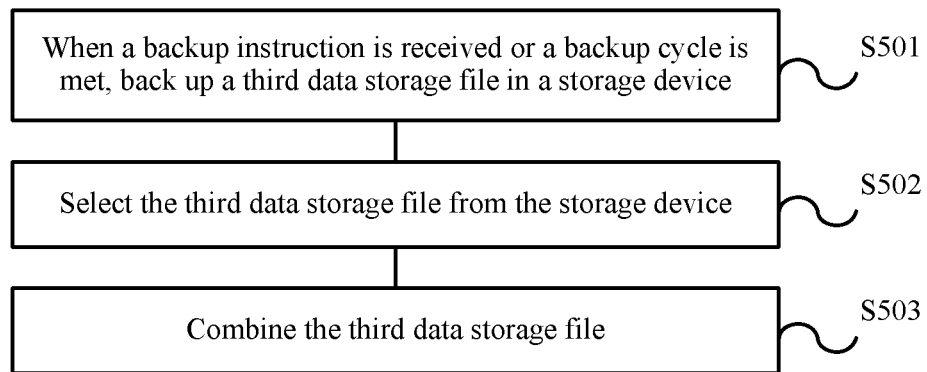
FIG. 5 is a schematic flowchart of still another backup operation according to an embodiment of the present application.

In another embodiment of the present application, a combination operation is immediately performed after a backup operation is completed, and all data storage files that are backed up are combined. This may also resolve a problem in the prior art that data reading performance is low and a time consumed for performing a backup operation is long. As shown in FIG. 5, the method includes the following steps.

S501. When a backup instruction is received or a predefined cycle for performing a backup operation is met, back up a third data storage file in a storage device.

Specifically, the third data storage file is used only to distinguish different data storage files instead of representing a quantity of the data storage files. The third data storage file may be all the data storage files in the storage device, or may be any data storage file in the storage device. Therefore, backing up the third data storage file may be backing up all the data storage files in the storage device, or may be backing up a data storage file newly added after the time for performing a backup operation most recently.

S502. Select the third data storage file from the storage device.

S503. Combine the third data storage file.

Specifically, after the backup operation is completed, the combination operation is immediately performed. In the combination operation, selection and combination processing methods are the same as those in step S202 and step S203, and details are not described herein again.

Figure 5A:
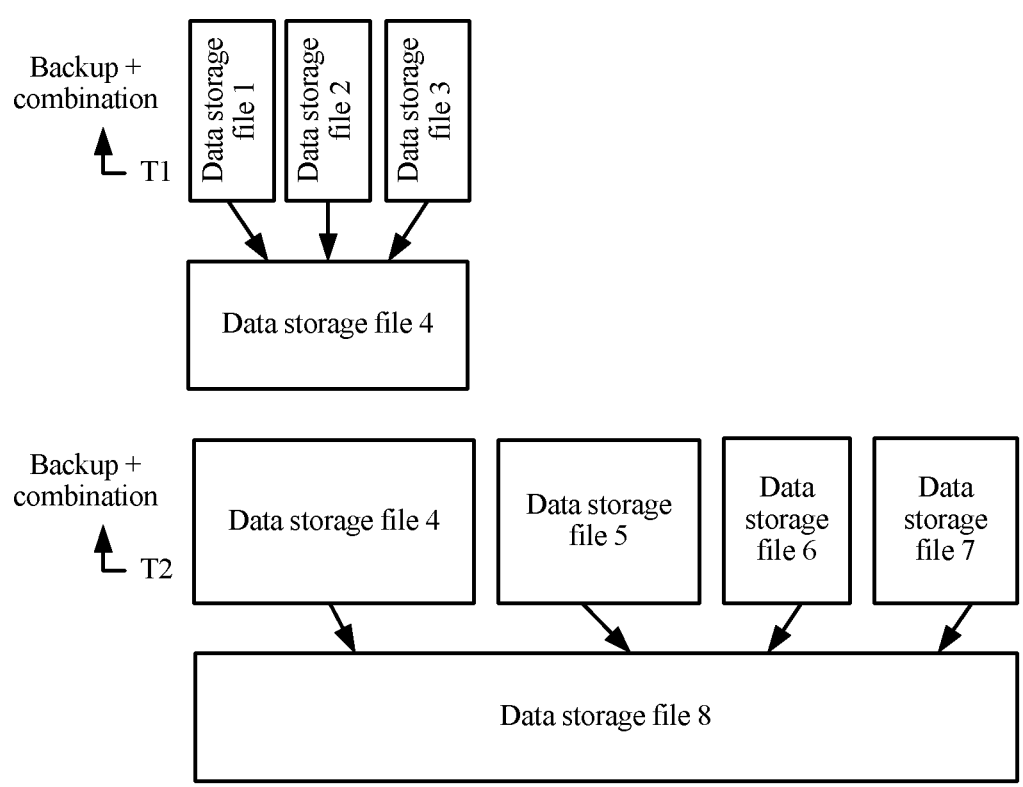
FIG. 5A is a schematic diagram of yet another backup operation according to an embodiment of the present application.

For example, FIG. 5A is a schematic diagram according to an embodiment of the present application. As shown in FIG. 5A, at a T1 moment, a backup instruction is received or a predefined cycle for performing a backup operation is met, a data storage file 1, a data storage file 2, and a data storage file 3 are backed up, and the data storage file 1, the data storage file 2, and the data storage file 3 are combined into a data storage file 4. At a T2 moment, the backup instruction is received again or the predefined cycle for performing a backup operation is met again, full backup is performed on the data storage file 4, a data storage file 5, a data storage file 6, and a data storage file 7, or incremental backup is performed on the data storage file 5, the data storage file 6, and the data storage file 7, and the data storage file 4, the data storage file 5, the data storage file 6, and the data storage file 7 are combined into a data storage file 8. This may also achieve an objective of the data processing method provided in this embodiment of the present application, and the combination operation improves data reading performance. When a backup operation is performed next time, particularly in an incremental backup operation, a data storage file newly added after the time for performing a backup operation most recently can also be found quickly, and a delay for performing a backup operation is shortened.

A person skilled in the art should understand that in this embodiment, in addition to immediately performing a combination operation forcibly after a backup operation, in a specific implementation process, the combination operation may further be performed when a quantity of the data storage files in the storage device is greater than or equal to a second threshold, or a predefined cycle for performing a combination operation is met, or a command for performing a combination operation is received, so as to resolve a problem of degraded reading performance of a database due to existence of multiple data storage files in the storage device.

In the method described in step S501 to step S503, a combination operation is immediately performed after a backup is completed. All data storage files in a same table that are backed up are combined, so as to ensure data reading performance of a database system. In addition, this avoids a problem that a data storage file that is backed up and a data storage file that is not backed up need to be distinguished when a data storage file is newly added between a current backup operation and a next combination operation. When a combination operation is performed next time, only the data storage file that is not backed up needs to be combined, and when a condition for performing a backup operation is met, a data storage file newly added after the time for performing a backup operation most recently can also be identified quickly, so that a backup operation is completed quickly, a time consumed for performing a backup operation and network resources consumed are reduced, and backup efficiency is improved.

It should be noted that, for a brief description, the foregoing method embodiments are represented as a series of actions. However, a person skilled in the art should appreciate that the present application is not limited to the described order of the actions. In addition, a person skilled in the art should also appreciate that the related actions in the embodiments described in this specification are not necessarily mandatory to the present application.

Another proper combination of steps that may be figured out by a person skilled in the art according to the content described in the foregoing also falls within the protection scope of the present application. In addition, a person skilled in the art should also appreciate that all the embodiments described in this specification are preferred embodiments, and the related actions are not necessarily mandatory to the present application.

Figure 6:
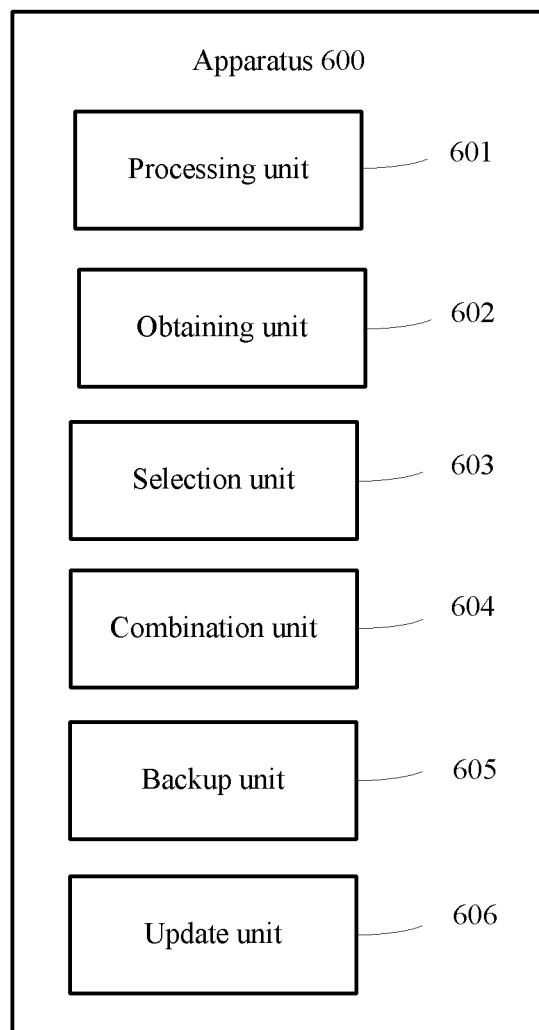
FIG. 6 is a schematic diagram of a data processing apparatus according to an embodiment of the present application.
Figure 7:
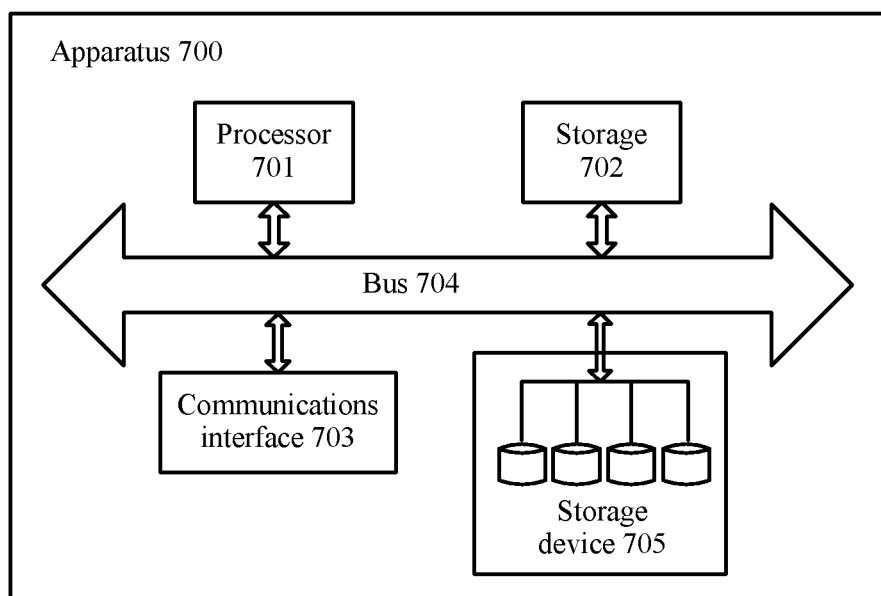
FIG. 7 is a schematic diagram of another data processing apparatus according to an embodiment of the present application.

With reference to FIG. 1 to FIG. 5A, the foregoing gives a detailed description of a data processing method according to the embodiments of the present application. With reference to FIG. 6 and FIG. 7, the following gives a description of a data processing apparatus according to the embodiments of the present application.

FIG. 6 is a data processing apparatus according to an embodiment of the present application. The apparatus includes a processing unit 601, an obtaining unit 602, a selection unit 603, and a combination unit 604.

The processing unit 601 is configured to: when any region in at least one region included in a database system meets a predefined condition, save data in the region that meets the predefined condition to a storage device. The storage device includes multiple data storage files. Each data storage file is corresponding to data in one region, and each data storage file includes time metadata. The time metadata is a region write time of the data in the region corresponding to each data storage file.

The obtaining unit 602 is configured to: when a condition for triggering a combination operation is met, obtain a backup operation time. The backup operation time is a time for performing a backup operation most recently.

The selection unit 603 is configured to select at least two first data storage files from the storage device. A region write time recorded in time metadata included in the at least two first data storage files is before the time for performing a backup operation most recently.

The combination unit 604 is configured to combine the selected at least two first data storage files.

It should be understood that the apparatus 600 in this embodiment of the present application may be implemented by using an application-specific integrated circuit (ASIC), or be implemented by using a programmable logic device (PLD). The foregoing PLD may be a complex programmable logic device (CPLD), a field-programmable gate array (FPGA), a generic array logic (GAL), or any combination thereof. When the data processing method shown in FIG. 2 is implemented by using software, the apparatus 600 and each module of the apparatus 600 may also be a software module.

Therefore, when a combination operation is performed by using the apparatus 600 provided in this embodiment, a time that is for performing a backup operation and that is recorded in a database system is obtained, and only a data storage file before a time for performing a backup operation most recently is combined, so that a problem of data reading performance of the database system is resolved. In addition, by using the foregoing apparatus, the time for performing a backup operation most recently is used as a demarcation, and the data storage file before the time for performing a backup operation most recently is combined. In comparison with the prior art, a data storage file newly added after the time for performing a backup operation most recently can be identified quickly, a time consumed in a backup process is reduced, backup efficiency in the database is improved, and network resources consumed are reduced. According to another aspect, when a combination operation is performed, a combination policy may be flexibly configured according to a factor such as a size or a quantity of data storage files. A combination operation may be performed on all data storage files, or a combination operation may be performed on some of the data storage files. In comparison with the combination method in the prior art that all the data storage files are combined into one data storage file, a problem of data reading performance is resolved by using the apparatus 600 provided in this embodiment of the present application, and network and disk read operations consumed by the combination operation are reduced by means of more flexible policy configuration.

Optionally, the selection unit 603 is further configured to select at least two second data storage files from the storage device. A region write time recorded in time metadata included in the at least two second data storage files is after a time for performing a backup operation most recently.

The combination unit 604 is further configured to combine the selected at least two second data storage files.

Optionally, the condition for triggering a combination operation is that a quantity of data storage files in the storage device is greater than or equal to a second threshold, or is a predefined cycle for performing a combination operation, or is that a command for performing a combination operation is received.

Optionally, the apparatus further includes a backup unit 605 and an update unit 606.

The backup unit 605 is configured to: when a condition for triggering a backup operation is met, back up a data storage file that is in the storage device and whose region write time recorded in time metadata is after the time for performing a backup operation most recently.

The update unit 606 is configured to update the backup operation time to a time for performing a current backup operation.

Optionally, the backup unit 605 in the apparatus 600 is further configured to back up all data storage files in the storage device when a condition for triggering a backup operation is met.

The update unit 606 is further configured to update the backup operation time to a time for performing a current backup operation.

Optionally, the condition for triggering a backup operation is a predefined cycle for performing a backup operation, or is that a command for performing a backup operation is received.

The apparatus 600 in this embodiment of the present application may be corresponding to performing a method in an embodiment of the present application, and the foregoing and other operations and/or functions of the units in the apparatus 600 are respectively used to implement corresponding procedures of the methods in FIG. 1 to FIG. 5A. For brevity, details are not described herein again.

According to the description of the apparatus, by using the data processing apparatus provided in this embodiment, when a combination operation is performed, a time for performing a backup operation most recently is obtained, a data storage file before the time for performing a backup operation most recently and a data storage file after the time for performing a backup operation most recently are combined separately. In comparison with a combination method in the prior art that all data storage files are combined into one data storage file, a problem in the combination method in the prior art that a data storage file newly added after the time for performing a backup operation most recently cannot be found quickly can be resolved, a time consumed in a backup process is reduced, backup efficiency in the database is improved, and network resources consumed are reduced. According to another aspect, when a combination operation is performed, a combination policy is flexibly configured according to a factor such as a size or a quantity of the data storage files. A combination operation may be performed on all data storage files, or a combination operation may be performed on some of the data storage files. In comparison with the combination method in the prior art that all the data storage files are combined into one data storage file, a problem of data reading performance is resolved by using the data processing method provided in this embodiment of the present application, and network and disk read operations consumed by the combination operation are reduced by means of more flexible policy configuration.

FIG. 7 is a schematic diagram of an apparatus 700 according to an embodiment of the present application. As shown in FIG. 7, the apparatus 700 includes a processor 701, a storage 702, a communications interface 703, a bus 704, and a storage device 705. The processor 701, the storage 702, the communications interface 703, and the storage device 705 perform communication by using the bus 704, or may implement communication in another manner such as wireless transmission. The storage 702 is configured to store an instruction. The processor 701 is configured to execute the instruction stored in the storage 702. The storage 702 stores program code, and the processor 701 may invoke the program code stored in the storage 702 to perform the following operations:

when any region in at least one region meets a predefined condition, saving data in the region that meets the predefined condition to a storage device, where the storage device includes multiple data storage files, each data storage file is corresponding to data in one region, each data storage file includes time metadata, and the time metadata is a region write time of the data in the region corresponding to each data storage file;

obtaining a backup operation time when a condition for triggering a combination operation is met, where the backup operation time is a time for performing a backup operation most recently;

selecting at least two first data storage files from the storage device, where a region write time recorded in time metadata included in the at least two first data storage files is before the time for performing a backup operation most recently; and combining the selected at least two first data storage files.

It should be noted that the processor 701 may be a central processing unit (CPU) or a microprocessor.

The storage 702 may be a read-only storage (ROM), a static storage device, a dynamic storage device, or a random access storage (RAM).

The storage device 705 may be multiple hard disk drives (HDD), or may be multiple solid state drives (SSD), or may be multiple other storage media.

Therefore, when a combination operation is performed by using the apparatus 700 provided in this embodiment, a time that is for performing a backup operation and that is recorded in a database system is obtained, and only a data storage file before a time for performing a backup operation most recently is combined, so that a problem of data reading performance of the database system is resolved. In addition, by using the foregoing apparatus, the time for performing a backup operation most recently is used as a demarcation, and the data storage file before the time for performing a backup operation most recently is combined. In comparison with the prior art, a data storage file newly added after the time for performing a backup operation most recently can be found quickly, a time consumed in a backup process is reduced, backup efficiency in the database is improved, and network resources consumed are reduced. According to another aspect, when a combination operation is performed, a combination policy may be flexibly configured according to a factor such as a size or a quantity of the data storage files. A combination operation may be performed on all data storage files, or a combination operation may be performed on some of the data storage files. In comparison with the combination method in the prior art that all the data storage files are combined into one data storage file, a problem of data reading performance is resolved by using the apparatus 700 provided in this embodiment of the present application, and network and disk read operations consumed by the combination operation are reduced by means of more flexible policy configuration.

Optionally, the processor 701 may further invoke the program code stored in the storage 702 to perform the following operations:

selecting at least two second data storage files from the storage device, where a region write time recorded in time metadata included in the at least two second data storage files is after the time for performing a backup operation most recently; and combining the selected at least two second data storage files.

Optionally, the condition for triggering a combination operation is that a quantity of data storage files in the storage device is greater than or equal to a second threshold, or is a predefined cycle for performing a combination operation, or is that a command for performing a combination operation is received.

Optionally, the processor is further configured to execute the instruction stored in the storage, so as to:

when a condition for triggering a backup operation is met, back up a data storage file that is in the storage device and whose region write time recorded in time metadata is after the time for performing a backup operation most recently; and update the backup operation time to a time for performing a current backup operation.

Optionally, the processor is further configured to execute the instruction stored in the storage, so as to:

when a condition for triggering a backup operation is met, back up all data storage files in the storage device; and update the backup operation time to a time for performing a current backup operation.

Optionally, the condition for triggering a backup operation is a predefined cycle for performing a backup operation, or is that a command for performing a backup operation is received.

The apparatus 700 in this embodiment of the present application may be corresponding to performing a method in an embodiment of the present application, and the foregoing and other operations and/or functions of the units in the apparatus 700 are respectively used to implement corresponding procedures of the methods in FIG. 1 to FIG. 5A. For brevity, details are not described herein again.

According to the description of the foregoing content, when a predefined condition for triggering a combination operation is met, a time for performing a backup operation most recently is obtained, the time for performing a backup operation most recently is used as a demarcation, data storage files before the time for performing a backup operation most recently are combined into at least one data storage file, and data storage files after the time for performing a backup operation most recently are combined into at least one data storage file, so that a problem of data reading performance of a database system is resolved. In comparison with the combination method in the prior art that all data storage files in a storage device are combined into one data storage file, a combination policy is flexibly configured according to a factor such as a size or a quantity of the data storage files. A combination operation may be performed on all the data storage files, or the combination operation may be performed on some of the data storage files. A problem of data reading performance is resolved by using the data processing method provided in this embodiment of the present application, and network and disk read operations consumed by the combination operation are reduced by means of more flexible policy configuration. According to another aspect, by using the foregoing apparatus 700, in a backup scenario, particularly in an incremental backup scenario, a data storage file newly added after a time for performing a backup operation most recently can be found quickly, so as to complete a backup operation. Therefore, time for performing a backup is reduced, and network resources consumed by performing the backup operation are significantly reduced.

An apparatus embodiment basically corresponds to a method embodiment, and therefore is described briefly; for related parts, refer to partial descriptions in the method embodiment. The described system embodiment is only an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present application without creative efforts.

The present application can be described in the general context of computer executable instructions executed by a computer, for example, a program module. Generally, the program unit includes a routine, program, object, component, data structure, and the like for executing a particular task or implementing a particular abstract data type. The present application may also be practiced in distributed computing environments in which tasks are performed by remote processing devices that are connected by using a communications network. In a distributed computing environment, program modules may be located in both local and remote computer storage media including storage devices.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage device, and includes several instructions for instructing a computer device (which may be a personal computer, a server, or a network device) to perform all or some of the steps of the methods described in the embodiments of the present application. The foregoing storage device includes: any medium that can store program code, such as a USB flash drive, a removable hard disk, a read-only memory (ROM), a random access memory (RAM), a magnetic disk, or an optical disc.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

In short, the foregoing descriptions are only examples of embodiments of the present application, but are not intended to limit the protection scope of the present application. Specific examples are used in this specification to describe the principle and implementations of the present application. The descriptions of the foregoing embodiments are only intended to help understand the method and core idea of the present application. In addition, a person skilled in the art may, according to the idea of the present application, make modifications with respect to the specific implementations and the application scope. Therefore, the content of this specification shall not be construed as a limitation on the present application. Therefore, the content of this specification shall not be construed as a limitation on the present application. Any modification, equivalent replacement, or improvement made without departing from the spirit and principle of the present application shall fall within the protection scope of the present application.

What is claimed is:

1. A data processing method for a database system comprising a table, the table comprising a region, wherein the method comprises:

saving data in the region as a data storage file to a storage device in response to the region meeting a predefined condition, wherein the data storage file comprises time metadata, the time metadata including a region write time of the data when being saved in the region;

determining a most recent time for performing a previous backup operation as a backup operation time;

determining that a trigger condition is met for performing a combination operation, wherein the trigger condition comprises that a total number of data storage files in the storage device is greater than or equal to a preset maximum number for the total data storage files;

in response to the trigger condition being met, combining at least two first data storage files with region write times that are prior to the backup operation time into at least one first new data storage file;

and combing remaining data storage files with region write times that are after the backup operation time into at least one second new data storage file;

performing a backup operation on the at least one first and second new data storage files, wherein a total number of at least one the first and second new data storage files no longer meet the triggering condition for the combination operation; and wherein the at least one first new data storage file is generated by: comparing sizes of each of the at least two first data storage files; combining first data storage files with a same size into a first new data storage file; combining first data storage files that have no same size match into another first new data storage file; and wherein the at least one second new data storage file is generated by: comparing sizes of each of the remaining data storage files; combining remaining data storage files with a same size into a second new data storage file; combining remaining data storage files that have no same size match into another second new data storage file.

2. The method according to claim 1, wherein the method further comprises:
selecting two second data storage files from the storage device, wherein a region write time recorded in time metadata of the two second data storage files indicates a time later than the most recent time for performing a backup operation; and
combining the two second data storage files.

3. The method according to claim 1, wherein the triggering condition for a combination operation is based on a predefined cycle for performing a combination operation, or a command received for performing a combination operation.

4. The method according to claim 1, wherein the method further comprises:
backing up, by the database system, a data storage file in response to a triggering condition for a backup operation, wherein the data storage file is in the storage device and whose region write time recorded in time metadata indicates a time later than the most recent time for performing a backup operation; and
updating the backup operation time to a time for performing a current backup operation.

5. The method according to claim 4, wherein the triggering condition for a backup operation is based on a predefined cycle for performing a backup operation, or
a command received for performing a backup operation.

6. The method according to claim 1, wherein the method further comprises:
backing up, by a third-party backup system, a data storage file in response to a triggering condition for a backup operation, wherein the data storage file is in the storage device and whose region write time recorded in time metadata indicates a time later than the most recent time for performing a backup operation; and
updating the backup operation time to a time for performing a current backup operation.

7. The method according to claim 1, wherein the method further comprises:
backing up, by the database system, all data storage files in the storage device in response to a triggering condition for a backup operation; and
updating the backup operation time to a time for performing a current backup operation.

8. The method according to claim 1, wherein the method further comprises:
backing up, by a third-party backup system, all data storage files in the storage device in response to a triggering condition for a backup operation; and
updating the backup operation time to a time for performing a current backup operation.

9. A data processing apparatus comprising:
a memory storing executable instructions; and
one or more processors coupled to the memory, wherein the one or more processors execute the instructions to:
in response to a region meeting a predefined condition, save data in the region as a data storage file to a storage device, wherein a database system comprises a table including the region, wherein the data storage file comprises time metadata including a region write time of the data when being saved in the region;
determine a most recent time for performing a previous backup operation as a backup operation time;
determine that a trigger condition is met for performing a combination operation, wherein the trigger condition comprises that a total number of data storage files in the storage device is greater than or equal to a preset maximum number for the total data storage files;
in response to the trigger condition being met, combine at least two data storage files with region write times that are prior to the backup operation time into at least one first new data storage file;
and combine remaining data storage files with region write times that are after the backup operation time into at least one second new data storage file;
perform a backup operation on the at least one first and second new data storage files, wherein a total number of at least one the first and second new data storage files no longer meet the triggering condition for the combination operation; and
wherein the at least one first new data storage file is generated by: comparing sizes of each of the at least two first data storage files; combining first data storage files with a same size into a first new data storage file; combining first data storage files that have no same size match into another first new data storage file; and
wherein the at least one second new data storage file is generated by: comparing sizes of each of the remaining data storage files; combining remaining data storage files with a same size into a second new data storage file; combining remaining data storage files that have no same size match into another second new data storage file.

10. The data processing apparatus according to claim 9, wherein the one or more processors execute the instructions to:
select two second data storage files from the storage device, wherein a region write time recorded in time metadata of the two second data storage files indicates a time later than the most recent time for performing a backup operation; and
combine the two second data storage files.

11. The data processing apparatus according to claim 9, wherein the triggering condition for a combination operation is based on a predefined cycle for performing a combination operation, or a command received for performing a combination operation.

12. The data processing apparatus according to claim 9, wherein the one or more processors execute the instructions to:
back up a data storage file in response to a triggering condition for a backup operation, wherein the data storage file is in the storage device and whose region write time recorded in time metadata indicates a time later than the most recent time for performing a backup operation; and
update the backup operation time to a time for performing a current backup operation.

13. The data processing apparatus according to claim 12, wherein the triggering condition for a backup operation is based on a predefined cycle for performing a backup operation, or
a command received for performing a backup operation.

14. The data processing apparatus according to claim 9, wherein the one or more processors execute the instructions to:
back up all data storage files in the storage device in response to a triggering condition for a backup operation; and
update the backup operation time to a time for performing a current backup operation.

15. A computer program product, comprising a non-transitory computer-readable medium storing computer executable instructions, that when executed by one or more processors, perform the operations of:
- saving data in the region as a data storage file to a storage device in response to the region meeting a predefined condition, wherein the data storage file comprises a table including the region, wherein the data storage file comprises time metadata including a region write time of the data when being saved in the region;
- determining a most recent time for performing a previous backup operation as a backup operation time;
- determining that a trigger condition is met for performing a combination operation, wherein the trigger condition comprises that a total number of data storage files in the storage device is greater than or equal to a preset maximum number for the total data storage files;
- in response to the trigger condition being met, combining at least two data storage files with region write times that are prior to the backup operation time into at least one first new data storage file;
- and combing remaining data storage files with region write times that are after the backup operation time into at least one second new data storage file;
- performing a backup operation on the at least one first and second new data storage files, wherein a total number of at least one the first and second new data storage files no longer meet the triggering condition for the combination operation; and
- wherein the at least one first new data storage file is generated by: comparing sizes of each of the at least two first data storage files; combining first data storage files with a same size into a first new data storage file; combining first data storage files that have no same size match into another first new data storage file; and
- wherein the at least one second new data storage file is generated by: comparing sizes of each of the remaining data storage files; combining remaining data storage files with a same size into a second new data storage file; combining remaining data storage files that have no same size match into another second new data storage file.

16. The computer program product according to claim 15, wherein the operations further comprise:
- selecting two second data storage files from the storage device, wherein a region write time recorded in time metadata of the two second data storage files indicates a time later than the most recent time for performing a backup operation; and
- combining the two second data storage files.

17. The computer program product according to claim 15, wherein the triggering condition for a combination operation is based on a predefined cycle for performing a combination operation, or a command received for performing a combination operation.

18. The computer program product according to claim 15, wherein the operations further comprise:
- backing up a data storage file in response to a triggering condition for a backup operation, wherein the data storage file is in the storage device and whose region write time recorded in time metadata indicates a time later than the most recent time for performing a backup operation; and
- updating the backup operation time to a time for performing a current backup operation.

19. The computer program product according to claim 18, wherein the triggering condition for a backup operation is based on a predefined cycle for performing a backup operation, or a command received for performing a backup operation.

20. The computer program product according to claim 15, wherein the operations further comprise:
- backing up all data storage files in the storage device in response to a triggering condition for a backup operation; and
- updating the backup operation time to a time for performing a current backup operation.

* * * * *

UNITED STATES PATENT AND TRADEMARK OFFICE
CERTIFICATE OF CORRECTION

PATENT NO. : 11,132,260 B2
APPLICATION NO. : 15/927301
DATED : September 28, 2021
INVENTOR(S) : Fang et al.

Page 1 of 1

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

In the Claims

Claim 1: Column 26, Line 44: "at least two first data storage files with region write" should read
-- at least two data storage files with region write --.

Signed and Sealed this
Fifth Day of July, 2022

Katherine Kelly Vidal
*Director of the United States Patent and Trademark Office*